United States Patent Office 3,552,229
Patented Jan. 5, 1971

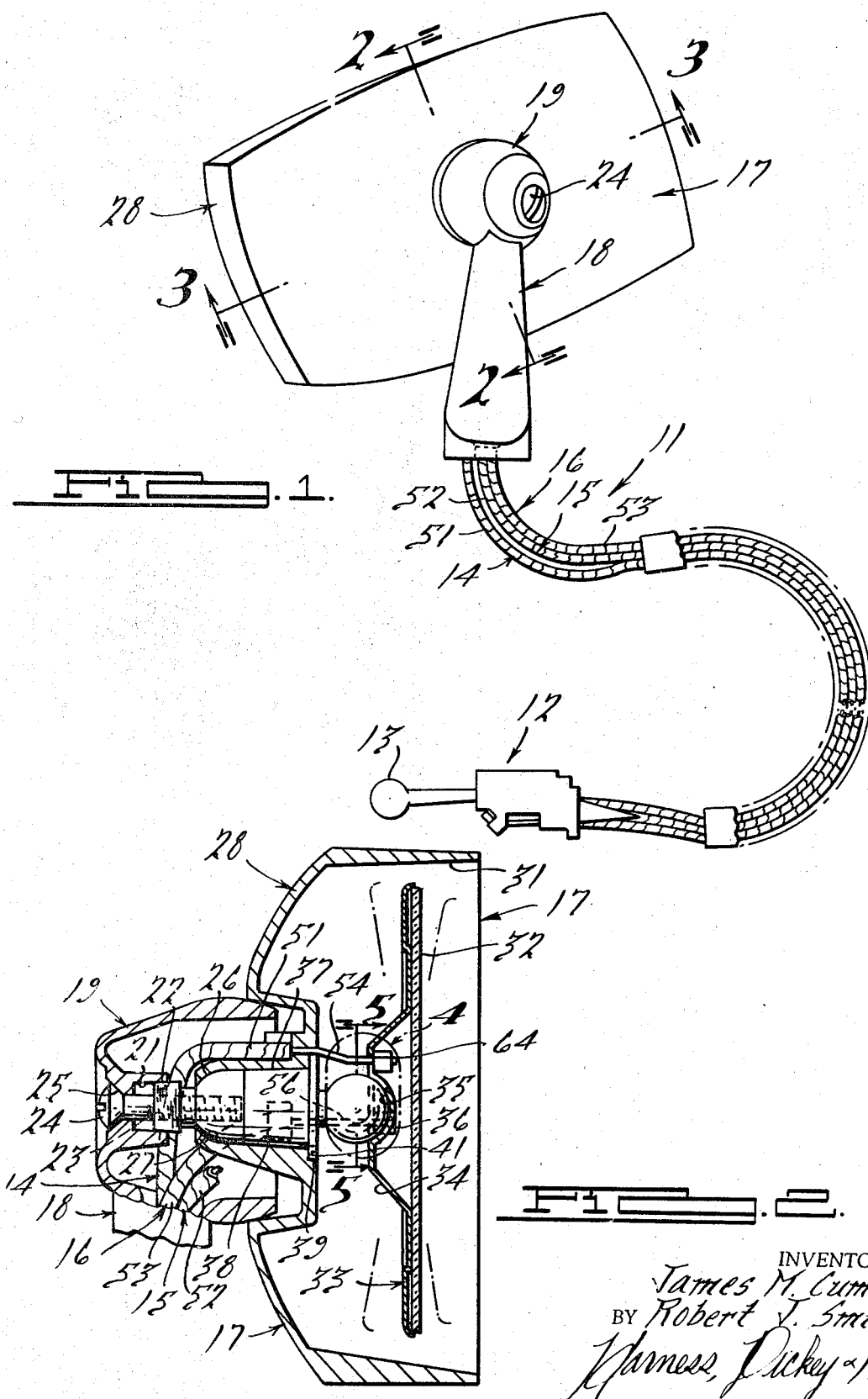

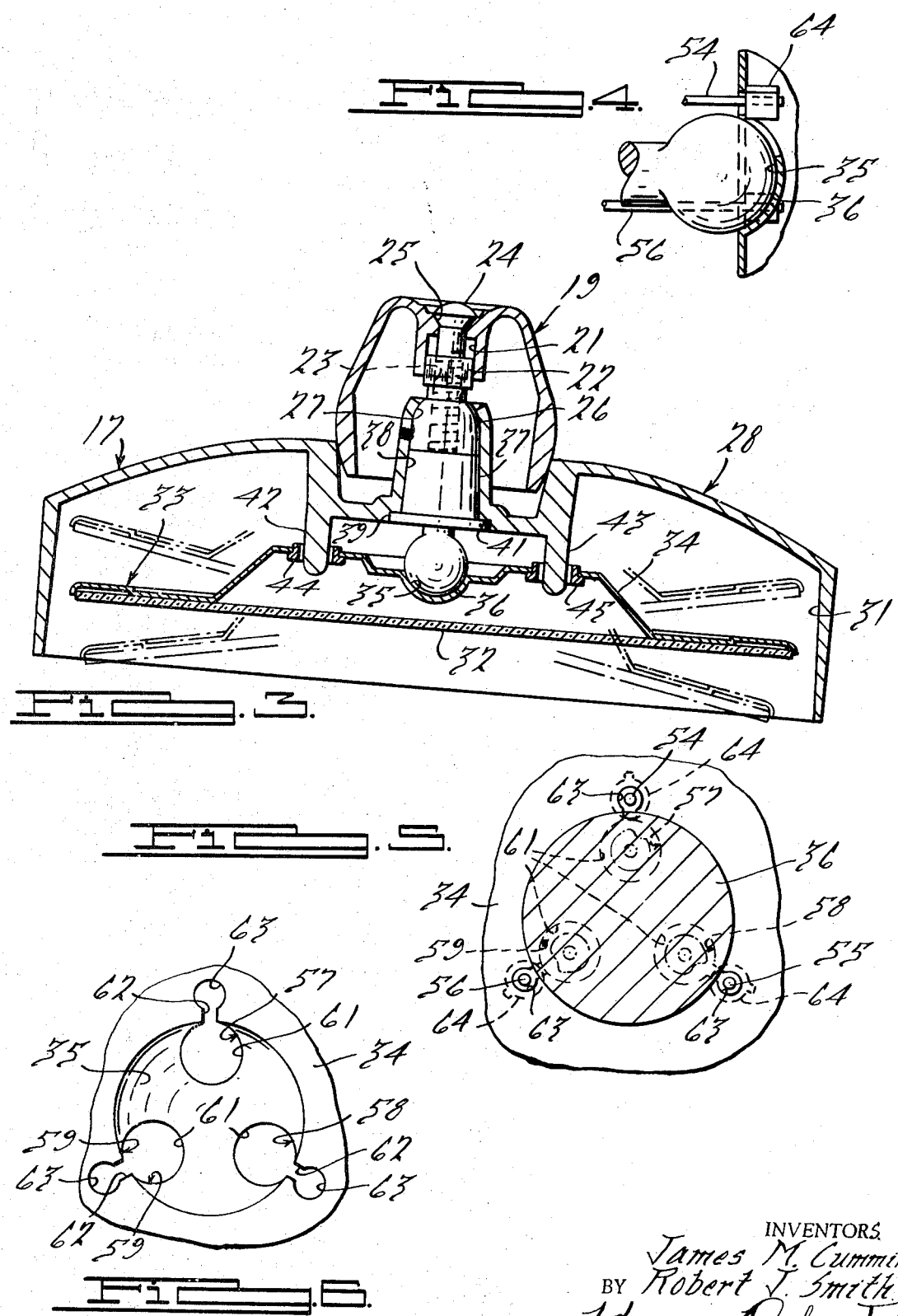

3,552,229
REMOTE CONTROL MIRROR AND METHOD OF MANUFACTURE THEREOF
James M. Cummins, Warren, and Robert J. Smith, Farmington, Mich., assignors to C. M. Hall Lamp Company, a corporation of Michigan
Filed Oct. 21, 1968, Ser. No. 769,305
Int. Cl. F16c 1/10; G02b 7/18
U.S. Cl. 74—501                                              11 Claims

ABSTRACT OF THE DISCLOSURE

A remote controlled outside rear view mirror assembly for automotive vehicles. The mirror assembly includes a control member, a remotely positioned mirror and a plurality of flexible transmitters for transmitting movement between the control member and the mirror. An improved structure is provided for attaching one end of the flexible transmitters to the associated component whereby the actuator ends and component are held in their assembled relationship.

BACKGROUND OF THE INVENTION

This invention relates to an improved remote controlled mirror and improved method of manufacture therefor.

In many forms of remote controlled mechanisms, such as remotely operated outside automotive rear view mirrors, one or more wire actuators are employed to transmit movement from the control member to the controlled member. In order to provide for the motion transmission, the ends of the wire actuator must be connected in some manner to both control and controlled members. In one common method for performing this attachment, the respective end of the wire actuator is passed through an opening in the respective member and a ferrule is fixed to the wire adjacent the member. This construction and method of assembly is relatively costly and makes it difficult to maintain a high degree of accuracy. In many of these types of remote control mechanisms, a plurality of wire actuators are employed and the lengths of the wires between the respective members must be accurately controlled. When the ferrules are attached to the assembled members, space does not permit the desired accuracy.

It is, therefore, a principal object of this invention to provide an improved method and apparatus for attaching a wire actuator to one member of a remote control mechanism.

It is another object of this invention to provide an improved remote control mechanism.

It is a further object of this invention to provide a method of assembly and remote control mechanism embodying a wire actuator that permits the wire actuators to be accurately sized as to length before assembly.

SUMMARY OF THE INVENTION

A remote control mechanism embodying this invention is particularly adapted for connecting a control wire to a supported member of the mechanism. The supported member is supported upon a supporting member with the members having coacting parts for permitting movement of the supported member. The control wire has an enlargement at one end thereof that is adapted to be passed through an opening in the supported member from one side of the supported member to the other side of the supported member when the coacting parts of the supporting and supported members are not in operative engagement. The coacting parts of the members are cooperative to effectively reduce the size of the opening sufficiently to preclude reentry of the control wire enlargement through the opening when the supported member is supported upon the supporting member.

The invention is particularly adapted for use in a method of assembling a remote control mechanism as described in the immediately preceding paragraph. With such a method of assembly, the enlargement at the one end of the control wire is passed through the opening in the supported member prior to assembly of the supported member upon the supporting member.

BRIEF DESCRIPTION OF THE DRAWINGS

FIG. 1 is a perspective view of a remote control mechanism in the form of an outside, automotive rear view mirror embodying this invention.

FIG. 2 is an enlarged cross-sectional view taken along the line 2—2 of FIG. 1.

FIG. 3 is an enlarged cross-sectional view taken along the line 3—3 of FIG. 1.

FIG. 4 is an enlarged view of the encircled area of FIG. 5 is an enlarged cross-sectional view taken along the line 5—5 of FIG. 2.

FIG. 2.

FIG. 6 is an enlarged plan view showing the socket opening portion of the frame of the mirror shown in the remaining figures.

DETAILED DESCRIPTION OF THE PREFERRED EMBODIMENT

Referring specifically to FIG. 1, a remote controlled, outside, automotive rear view mirror embodying this invention and adapted to be assembled according thereto is identified generally by the reference numeral 11. The mirror assembly 11 includes a control member 12 that is adapted to be positioned in the interior of an associated motor vehicle and which includes a control lever 13 supported for universal pivotal movement in any known manner. As will become more apparent as this description proceeds, a plurality of Bowden wire actuators 14, 15 and 16 interconnect the control lever 13 with a mirror of a mirror head assembly, indicated generally by the reference numeral 17, which is adapted to be mounted on the exterior sheet metal of the associated motor vehicle.

The mirror head assembly 17 is comprised of a mounting base portion 18 having an enlarged hollow portion 19 at its upper end. Referring now additionally to FIGS. 2 and 3, the portion 19 is formed with a square opening 21 in which a complementary shank portion 22 of an attachment member is received. The attachment member is formed with a tapped opening 23 in which a threaded fastener 24 is received. The threaded fastener passes through an opening 25 formed in the mounting portion enlargement 19 for affixing the attachment member thereto. The attachment member has at its outer end a semi-spherical portion 26 that is received in a complementary cavity 27 of a mirror head, indicated generally by the reference numeral 28. By suitably tightening the threaded fastener 24, the mirror head 28 is affixed to the mounting portion 18 and due to the spherical relationship between the surfaces 26 and 27, the angular position of the head 28 with respect to the mounting portion 18 may be adjusted.

The mirror head 28 includes a hooded portion that defines an opening 31 in which a mirror glass 32 is positioned. The mirror glass 32 is supported within a mirror frame, indicated generally by the reference numeral 33, which frame has a rearwardly extending embossment 34 formed at its center. The embossment 34 defines a socket cavity 35 that has the shape of a spherical segment. A ball 36 is received within the cavity 35 to provide a ball and socket connection. The ball 35 is formed integrally with a generally cylindrical portion 37 that is received in a complementary opening 38 formed in the mirror head 28. A shoulder 39 formed adjacent the portion 37 abuttingly engages a complementary recess 41 formed at the outer end of the opening 38 so that the mirror 32 is supported for universal pivotal movement with respect to the mirror head 28 and mounting portion 18.

In order to preclude any substantial rotary movement of the mirror 32, the head 28 is formed with a pair of outwardly extending pins 42 and 43 (FIG. 3) that are received in openings formed in nylon bushings 44 and 45, respectively, which bushings are affixed to the embossed portion 34 of the frame 33.

Each of the Bowden wire actuators 14, 15 and 16 comprises a protective sheath 51, 52, and 53 that encircles a respective wire actuator 54, 55 and 56. Each of the wire actuators 54, 55 and 56 has one of its ends connected to the control lever 13 in any known manner. These ends of the wire actuators 54, 55 and 56 are connected to the control lever 13 at circumferentially spaced locations. Pivotal movement of the control lever 13, therefore, creates either a pulling or pushing force on the wire actuators 54, 55 and 56 depending upon the direction of movement. This movement is transmitted to the mirror glass 32 in the manner now to be described.

At circumferentially spaced locations about the socket opening 35 in the mirror frame 33, key hole shaped openings 57, 58 and 59 are formed. Each of the openings 57, 58 and 59 is comprised of a first, larger diameter portion 61 that is formed in the socket portion 35. A narrow section 62 extends from the portion 61 outwardly from the socket opening 35 into a smaller diameter opening 63. The openings 63 are disposed radially outwardly of the socket cavity 35.

Ferrules 64 are affixed to each of the control wires 54, 55 and 56 at the end opposite to the end connected to the control lever 13 and at an accurately spaced distance from the point of connection to the control lever 13. The ferrules 64 are of a size that will permit their entry through the portions 61 of the openings 57, 58 and 59 but are sufficiently large so that they cannot pass through the portions 63 of these openings. Thus, as may be readily seen from FIG. 4, when the mirror frame 33 is supported upon the ball portion 36, the ferrules 64 will be trapped on the side of the mirror frame 33 adjacent the mirror glass 32.

In assembly, the one end of each of the wire actuators 54, 55 and 56 is connected to the control lever 13 in any known manner. The ferrules 64 are then affixed to the respective control wires 54, 55 and 56 at the desired distance so as to determine the effective length of the respective control wires 54, 55 and 56. Before the mirror frame 33 is supported upon the ball portion 36, the ferrules 64 are passed through the portions 61 of the respective openings 57, 58 and 59 in the mirror frame 33. The wires 54, 55 and 56 are then passed outwardly through the opening portions 62 until they register with the portions 63. The socket portion 36 of the mirror frame is then placed in contact with the ball portion 36 and the ends of the protective sheaths 51, 52 and 53 are affixed to the mirror head 28 in any known manner. Hence, the mirror 32 and its associated frame 33 will be affixed relative to the mirror head 28 and the wire actuators 54, 55 and 56 will be held in this assembled relationship. The mirror assembly 11 may then be installed in the vehicle in a known manner.

What is claimed is:

1. A remote control mechanism comprising a supporting member, a supported member, said supporting member and said supported member having interengaging surfaces for movably supporting said supported member upon said supporting member, and a control wire having an enlargement at one end thereof, said supported member having an opening formed therein, said opening being sized and shaped to pass said control wire enlargement from one side of said supported member through said opening to the other side of said supported member when said interengaging surfaces of said supporting member and said supported member are not in operative engagement, said coacting parts cooperating to effectively reduce said opening sufficiently to preclude reentry of said control wire enlargement through said opening from said other side of said supported member to said one side of said supported member when said supported member is supported upon said supporting member by said interengaging surfaces for transmitting control movement between said control wire and said control member.

2. A remote control mechanism as set forth in claim 1 wherein the opening in the supported member is comprised of two portions, the first of said portions being sized and shaped to pass said control wire enlargement and the second of said portions being sized and shaped to pass said control wire adjacent said enlargement but to preclude passage of said control wire enlargement, said first portion of said opening being positioned in the respective interengaging surfaces of said supported member.

3. A remote control mechanism as set forth in claim 1 wherein the interengaging surfaces of the supporting member and of the supported member define respectively a ball and a socket of a ball and socket connection for pivotal support of said supported member upon said supporting member.

4. A remote control mechanism as set forth in claim 3 wherein the opening in the supported member is comprised of two portions, the first of said portions being sized and shaped to pass said control wire enlargement and the second of said portions being sized and shaped to pass said control wire adjacent said enlargement but to preclude passage of said control wire enlargement, said first portion of said opening being disposed in said socket and said second portion of said opening being juxtaposed to said socket.

5. A remote control mechanism as set forth in claim 4 wherein the second portion of the opening is disposed outwardly of the ball when the supported member is supported upon the supporting member a sufficient distance to preclude interference between the control wire and said ball.

6. A remote control mechanism as set forth in claim 5 wherein the supported member comprises a mirror.

7. A remote control mechanism as set forth in claim 1 wherein there are a plurality of control wires each affixed to the supported member in the manner defined in claim 1, each of said wires being affixed to said supported member at spaced locations relative to its point of movable support.

8. A remote control mechanism as set forth in claim 7 wherein the interengaging surfaces of the supporting member and supported member define, respectively, a ball and socket of a ball and socket connection for universal pivotal movement of said supported member upon said supporting member.

9. A remote control mechanism as set forth in claim 8 wherein each of the openings has a first portion sized and shaped to pass the respective control wire enlargement from one side of the supported member to the other side of the supported member through the first portion, said first portion of each of said openings being located in said socket, each of said openings further having a second portion disposed outwardly of said socket and sized sufficiently to pass the portion of the respective control wire adacent said enlargement but of insufficient size to pass the respective of said enlargements.

10. A remote control mechanism as set forth in claim 9 wherein the supported member comprises a mirror.

11. The method of assembling a remote control mechanism comprised of a controlled member, a control member, supporting means for supporting at least one of the members for pivotal movement and at least one flexible transmitter for transmitting control movement from the control member to the controlled member, said method comprising the steps of inserting a wire actuator into a protective sheath for forming the flexible transmitter, forming an enlargement at one end of the wire actuator, forming an opening in the one member large enough to pass the enlargement at the one end of the wire actuator when the one member is not supported upon the supporting means, passing the enlargement at the one end of the wire actuator through the formed opening in the one member, and supporting the one member upon the supporting means with the one member and supporting means cooperating to effectively reduce the opening sufficiently to preclude reentry of the enlargement through the opening.

References Cited

UNITED STATES PATENTS

| | | | |
|---|---|---|---|
| 3,096,664 | 7/1963 | Walsh | 74—501 |
| 3,348,425 | 10/1967 | Van Noord | 74—501 |
| 3,369,427 | 2/1968 | Brighton et al. | 74—501 |
| 3,420,118 | 1/1969 | Dudley | 74—501 |

MANUEL A. ANTONAKAS, Primary Examiner